(12) United States Patent
Xu et al.

(10) Patent No.: US 8,761,815 B2
(45) Date of Patent: Jun. 24, 2014

(54) METHOD, DEVICE AND SYSTEM FOR ACCESSING MOBILE DEVICE USER INFORMATION

(75) Inventors: David Ning Lai Xu, San Jose, CA (US); Ephrem A. Chemaly, Lake in the Hills, IL (US); Parikshit H. Dharawat, Sunnyvale, CA (US); Eric J. Overtoom, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 1283 days.

(21) Appl. No.: 11/689,239

(22) Filed: Mar. 21, 2007

(65) Prior Publication Data

US 2008/0233977 A1 Sep. 25, 2008

(51) Int. Cl.
*H04W 4/00* (2009.01)

(52) U.S. Cl.
USPC ........... 455/461; 455/403; 455/558; 709/203; 379/433.09

(58) Field of Classification Search
USPC .............. 455/418, 428, 445, 435.1, 522, 560, 455/403, 558, 412.1, 412.2, 413, 414.1, 455/414.2, 414.3, 419, 420, 461, 466; 379/433.09; 370/209, 342, 142, 337; 375/211, 146, 219, E1.003; 709/203
See application file for complete search history.

(56) References Cited

U.S. PATENT DOCUMENTS

| | | | | |
|---|---|---|---|---|
| 5,475,689 | A * | 12/1995 | Kay et al. | 370/337 |
| 6,205,135 | B1 * | 3/2001 | Chinni et al. | 370/356 |
| 6,694,152 | B1 * | 2/2004 | Helle | 455/558 |
| 2002/0052916 | A1 * | 5/2002 | Kloba et al. | 709/203 |
| 2004/0229595 | A1 * | 11/2004 | Laursen et al. | 455/403 |
| 2005/0021784 | A1 | 1/2005 | Prehofer | |
| 2007/0060096 | A1 * | 3/2007 | Hayakawa | 455/403 |
| 2008/0227385 | A1 * | 9/2008 | Bappu et al. | 455/3.06 |

FOREIGN PATENT DOCUMENTS

| | | |
|---|---|---|
| EP | 1 494375 A2 | 1/2005 |
| EP | 1528773 B1 | 7/2006 |
| WO | WO 2005029890 A1 | 3/2005 |

OTHER PUBLICATIONS

Macmillan Dictionary, subscribe, Macmillan Dictionary, 1 page.*

* cited by examiner

*Primary Examiner* — Mahendra Patel

(57) ABSTRACT

A method, device and system for accessing mobile device user information. A Personal Content Server (PCS) is used to store mobile device user information for one or more mobile device end users. The mobile device user information can be accessed and downloaded, via a communication network, to one or more mobile devices in an appropriate manner, e.g., wirelessly or via a wired connection between the mobile device and the communication network. The mobile device user information allows one or more end users to operate at least one mobile device according to their respective user preferences. The method can include authenticating an end user before allowing user information to be downloaded to the end user's mobile device, and updating user information between the mobile device and the PCS. Mobile device user information can include user identity information, personal preferences, subscription information and application profile information.

24 Claims, 2 Drawing Sheets

METHOD, DEVICE AND SYSTEM FOR ACCESSING MOBILE DEVICE USER INFORMATION

BACKGROUND OF THE INVENTION

1. Field of the Invention

The invention relates to mobile devices and mobile device systems, including wireless mobile devices and systems. More particularly, the invention relates to systems and methods for accessing user information by one or more mobile device end users for one or more mobile devices.

2. Description of the Related Art

The amount of information stored on end user communication devices, including mobile communication devices, continues to increase. Such devices include cellular telephones, smart telephones (smartphones), personal digital assistants (PDAs), and other wireless handheld and mobile communication devices. A large portion of the information stored on such devices is what generally is considered to be personal information. Such information can include contact information, such as names, telephone numbers and addresses. Other personal information can include calendars, electronic notepads, emails messages, and user subscription information, e.g., the user's cellular telephone plan (voice and data), music download subscription and/or other subscription information. Currently or in the future, as mobile devices are becoming more powerful and sophisticated, additional end user information also can include credit card authentication information, application access password information, medical records and other personal information.

Conventional methods and systems for storing such end user information generally tend to be relatively restrictive, localized and generally identified with or tied to an individual mobile device. If the particular mobile device is compromised, e.g., damaged, lost, stolen or misplaced, end user access to the information is temporarily or permanently lost. Systematically or periodically backing up such information on an external device, such as a laptop computer, often is relatively impractical unless the backup device is with the mobile device much of the time.

Moreover, the relatively localized structure of information storage on mobile devices does not lend itself well to a single mobile device supporting multiple users, each with a different end user profile. Typically, mobile devices are configured to have stored thereon a single set of end user information, which is accessible by the individual end user who owns or has immediate possession of the mobile device. Therefore, some individual end users maintain multiple mobile devices (e.g., one for work, one for family) and/or each member of a single family often has their own individual mobile device, with their own personal information stored thereon.

Various methods and systems exist for providing various information to mobile devices. For example, a method exists for automatically storing a telephone number, provided by a telephone assistance service, on the mobile device of the party requesting the telephone number from the telephone assistance service. Also, a method exists for downloading content stored on a set-top box to a mobile device in response to a content selection made by the mobile device user when the mobile device and the set-top box have an established connection therebetween. Other conventional methods, systems and devices for providing various information to mobile devices include the ability to share or transfer information, such as digital documents, between pocket digital wireless devices within a wireless personal area network (WPAN) using a short-range radio frequency technology, such as Bluetooth™. Also, network authentication systems exist that have a centralized, dedicated user profile server that allows mobile devices relatively easier login and authenticated access to networks and network applications.

DETAILED DESCRIPTION

Figure 1:
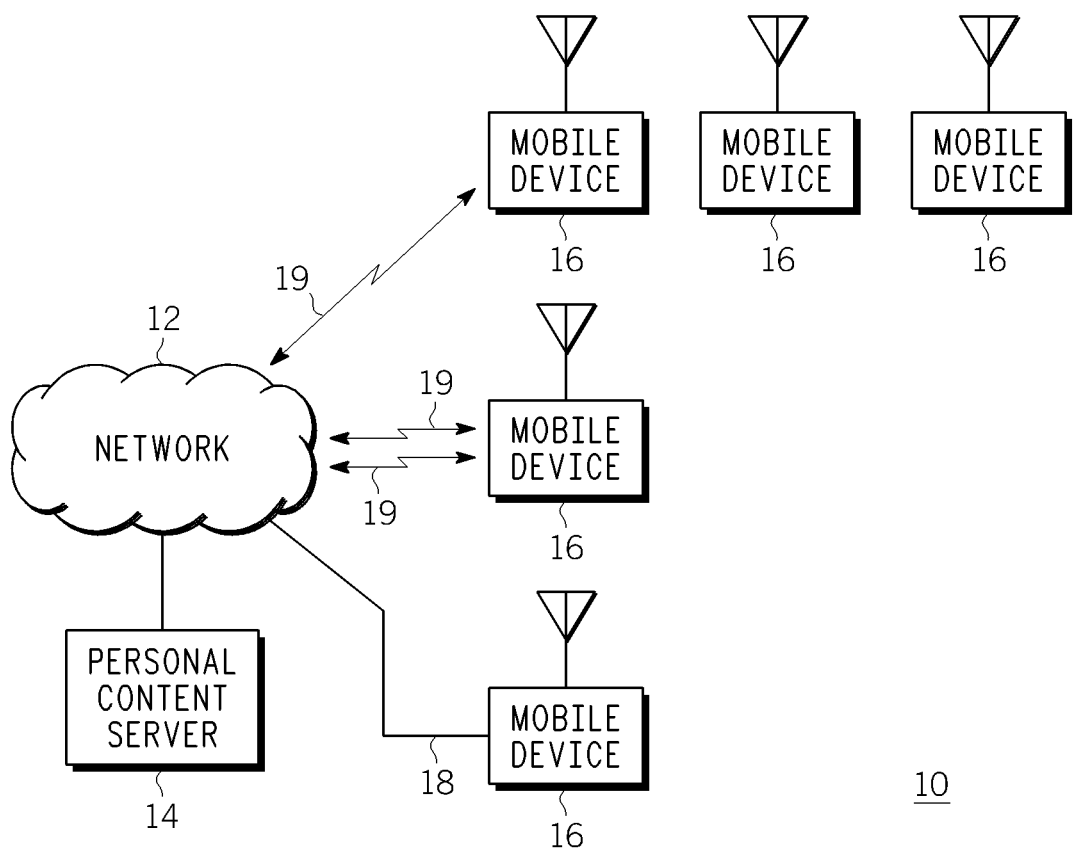
FIG. 1 is a block diagram of a system for accessing mobile device user information.

In the following description, like reference numerals indicate like components to enhance the understanding of the methods, devices and systems for accessing mobile device user information through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

The methods, devices and systems described herein involve the ability to access and download or update end user specific information and other end user information to one or more communication devices, such as one or more mobile communication devices. Thus, for example, a mobile device end user seeking to access or otherwise make use of their personal user profile and other user specific information is not restricted to accessing such information only through a single mobile device. In this manner, an end user's personal preference information and user profile can be retrieved, accessed, updated and otherwise made use of via multiple mobile devices. Also, a single mobile device can simultaneously serve and be accessed by multiple end users, each with their own, separate user specific information and user profile.

Referring now to FIG. 1, shown is a block diagram of a system 10 for accessing mobile device user information. The system 10 includes a network 12, a Personal Content Server (PCS) 14 coupled to the network 12, and one or more end-user communication devices, such as one or more mobile devices 16. The network 12 can be and/or can include any suitable wired or wireless network system, such as a cellular telephone network, the Internet or other suitable public network, any wired or wireless wide area network (WAN), local area network (LAN) or wireless local area network (WLAN), such as a residential network, or other suitable network or network system.

The PCS 14 can be any server or other device suitable for storing user specific information, such as user subscription and call plan information, and other mobile device user information. The PCS 14 also is suitable for coupling to the network 12 in a manner that allows one or more mobile devices to access, e.g., via the network 12, at least a portion of the mobile device user information stored on the PCS 14. Although the PCS 14 is shown as a device or component external to the network 12, it should be understood that at least a portion of the PCS 14 can be an internal portion of the network 12.

One or more of the mobile devices 16 can be any suitable device that can connect, communicate and exchange information with the network 12 or a network device. The connection between the network 12 and one or more of the mobile devices 16 can be a wired connection, as shown generally by a wired connection 18 between the network 12 and one of the mobile devices 16. Alternatively, the connection between the network 12 and one or more of the mobile devices 16 can be wireless (shown generally as 19), e.g., using the general packet radio service (GPRS), or according to one or more wireless networking standards, such as one or more standards within the 802.11x family of standards (e.g., Bluetooth, and wireless fidelity or wi-fi). Although not shown, the network 12 typically includes one or more devices, such as routers and/or computers, for establishing a wired or wireless connection with one or more of the mobile devices 16.

Figure 2:
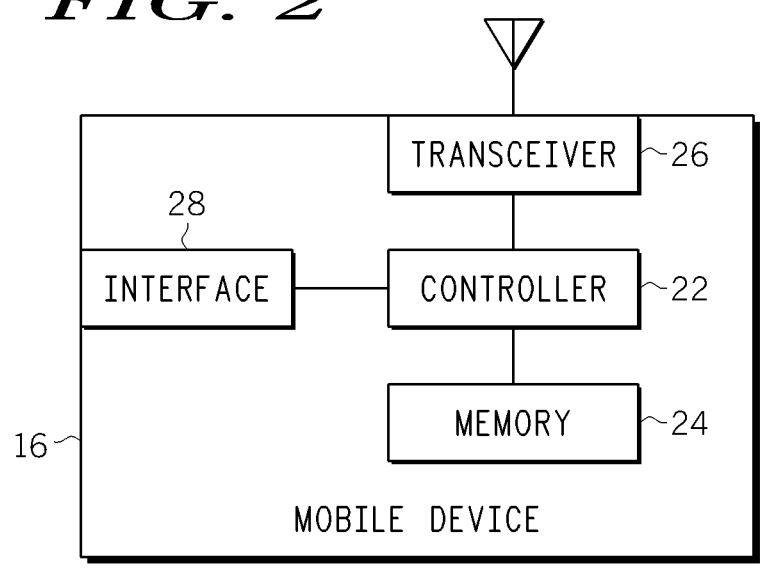
FIG. 2 is a block diagram of a mobile device for use in a system for accessing mobile device user information.

Referring now to FIG. 2, with continuing reference to FIG. 1, shown is a block diagram of a mobile device suitable for use in a system for accessing mobile device user information, e.g., one of the mobile devices 16 used in the system 10 of FIG. 1. The mobile device 16 can be any device suitable for transmitting and receiving data and/or other communications information, e.g., mobile device communications, via the network 12. For example, the mobile device 16 can be a cellular telephone, a smart telephone, a personal digital assistant (PDA), a digital music player and/or other handheld mobile device. Also, the mobile device 16 can be a laptop personal computer (PC), a notebook PC and/or other mobile computing device with communications capability.

The mobile device 16 can be partially or completely configured in the form of hardware circuitry and/or other hardware components within a larger device or group of components. Alternatively, the mobile device 16 can be partially or completely configured in the form of software, e.g., as processing instructions and/or one or more sets of logic or computer code. In such configuration, the logic or processing instructions typically are stored on a data storage device, which typically is coupled to a processor or controller. The processor accesses the necessary instructions from the data storage device and executes the instructions or transfers the instructions to the appropriate location within the device.

The mobile device 16 includes a controller 22 and a memory 24 coupled to the controller 22. The mobile device 16 also can include a transceiver 26, coupled to the controller 22, for wireless communication between the mobile device 16 and the network 12. The mobile device 16 also can include an interface 28, coupled to the controller 22, for wired connection communication between the mobile device 16 and the network 12. The controller 22 controls the operation of the mobile device 16, including the ability of the mobile device 16 to communicate with the network 12 and other devices, e.g., to receive mobile device communication information from the network 12 and other suitable information sources.

The memory 24 can be any suitable memory device, including random access memory (RAM), read-only memory (ROM) and Flash memory devices. In general, the memory 24 stores logic, processing instructions and other information (e.g., end user information) and data for the controller 22 (and other device components) to access.

Typically, the mobile device 16 includes the transceiver 26, which is configured to allow the mobile device 16 to communicate wirelessly with the network 12, as well as with other devices and information sources (not shown). Alternatively, the mobile device 16 also may include the interface 28, which is configured to allow the mobile device 16 to communicate with the network 12 and other devices using a wired connection, e.g., via a Universal Serial Bus (USB) connection or other suitable wired connection between the mobile device 16 and the network 12.

One or more of the controller 22, the memory 24, the transceiver 26 and the interface 28 can be comprised partially or completely of any suitable structure or arrangement, e.g., one or more integrated circuits. Also, it should be understood that the mobile device 16 includes other components, hardware and software (not shown) that are used for the operation of other features and functions of the mobile device 16 not specifically described herein.

As discussed hereinabove, conventionally, the storage of end user information on mobile devices tends to involve the localized storage of information, such as user specific information and user profile, generally tied to or associated with the mobile device and its subscribed end user. If the particular mobile device is compromised, e.g., lost, stolen or misplaced, end user access to the information is temporarily or permanently lost. Backing up and/or re-entering such information typically is relatively impractical and/or time consuming.

Moreover, conventional storage of end user information on mobile devices typically is not conducive to a single mobile device supporting multiple users, each with one or more separate end user profiles. Thus, for example, each member of a family often has their own individual mobile device, with their own personal information stored thereon. Similarly, an end user that does not have immediate possession of their primary mobile device is not able to use a different mobile device according to their own user preferences, which are stored on their primary mobile device. Also, conventional methods and system typically do not allow for a single end user to be supported by multiple mobile devices, other than the end user establishing and maintaining (and paying for) separate subscription relationships with each of the multiple mobile devices. Thus, a single end user often has multiple devices, e.g., one for work and one for personal use.

Figure 3:
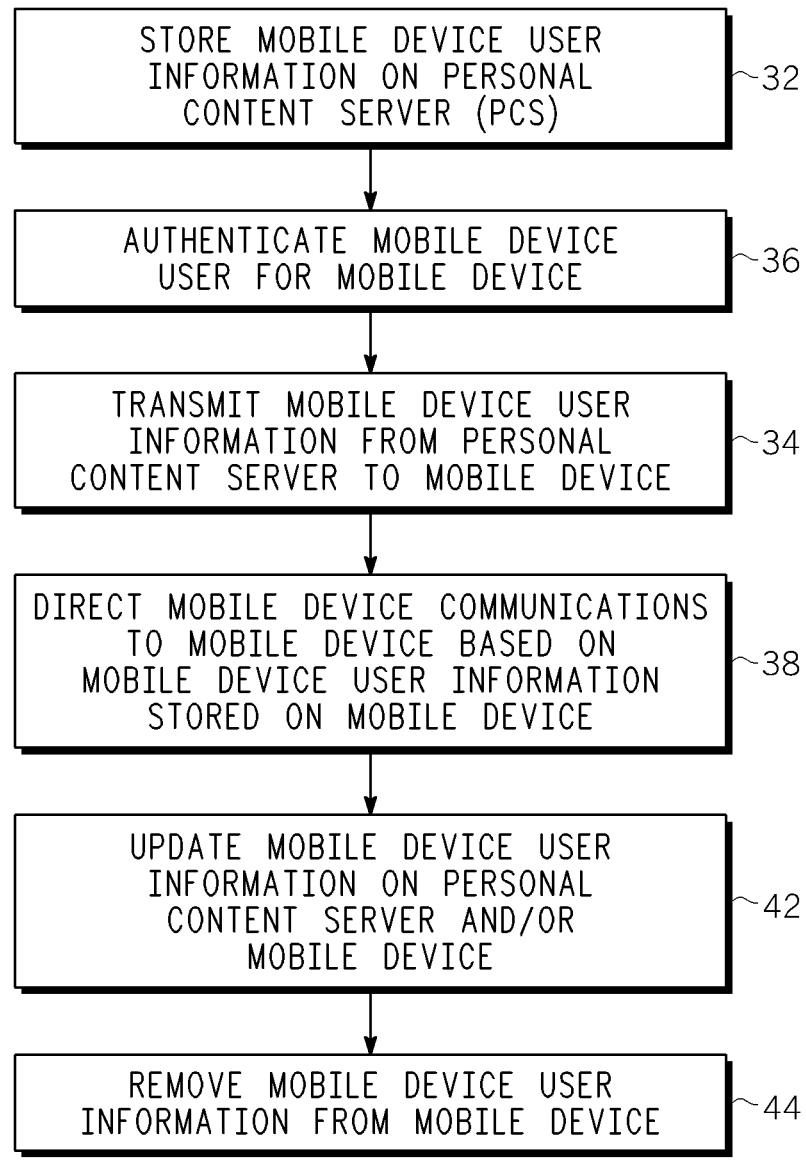
FIG. 3 is a flow chart that schematically illustrates a method for accessing mobile device user information.

Referring now to FIG. 3, with continuing reference to FIG. 1 and FIG. 2, shown is a flow chart that schematically illustrates a method 30 for accessing mobile device user information. The method 30 will be described along with the operation of the system 10 and the mobile device 16. The method 30 includes a step 32 of storing mobile device user information on the Personal Content Server (PCS) 14. As discussed hereinabove, the PCS 14 is coupled to the network 12 in a manner that allows mobile devices to access, via the network 12, the mobile device user information stored on PCS 14.

Mobile device user information can include any end user information that is or can be stored on a mobile device. Such information can include user specific information, which, in general, is any end user information, such as application information and/or personal information, that can be attributed to and/or associated with a particular end user or even a group of end users. User specific information also can include the personal preferences and/or profiles of an end user.

End user application information can include various information that identifies the end user (i.e., user identity information) and/or allows the end user to operate the mobile device and execute various applications stored on and/or associated with the mobile device. For example, mobile device user information can include user subscription information, such as the user's cellular telephone plan (voice and data), including information relating to the particular features and options available to the user, such as electronic mail and voice mail. Other subscription information can include online service information, such as information for accessing, downloading and consuming (viewing, listening to) music, movies and other content.

End user personal information can include personal information of the end user, such as contact information, i.e., names, addresses and telephone numbers of contacts of the end user. Other user personal information can include, but is not limited to, calendars and other date information, electronic notepads and electronic mail (email) messages. Also, as discussed hereinabove, other mobile device user information can or will include credit card authentication information, application access password information, medical records and other personal information.

The mobile device user information is stored on the PCS 14 by downloading to and/or entering the information on the PCS 14 using any suitable device or interface, including one or more mobile devices 16. For example, mobile device user information manually entered into a mobile device 16 can be downloaded from the mobile device to the PCS 14, via the network 12, using an appropriate wireless or wired connection between the mobile device 16 and the network 12. Alternatively, the PCS 14 can have a direct user interface for entering mobile device user information. It should be understood that adding to and/or updating existing mobile device user information stored on the PCS 14 can be performed in a similar manner. As will be discussed in greater detail hereinbelow, the mobile device user information stored on the PCS 14 is a dynamic "master copy" of mobile device user information from which one or more mobile devices 16 can access various portions thereof, such as user application information and user personal information.

The method 30 includes a step 34 of transmitting or otherwise transferring mobile device user information from the PCS 14 to one or more mobile devices 16. For example, at least a portion of the mobile device user information stored on the PCS 14 for one or more mobile device end users is downloaded from the PCS 14 to one or more mobile devices of interest. Mobile device user information can be transmitted from the PCS 14, via the network 12, to the mobile device 16 in any suitable manner, e.g., using any suitable wireless or wired connection.

For example, mobile device user information can be transmitted to the mobile device 16 wirelessly, e.g., using GPRS or according to one or more wireless networking standards, such as Bluetooth or wi-fi. The PCS 14 and/or the network 12 can include one or more wireless access points configured to wirelessly connect with one or more mobile devices 16. Alternatively, mobile device user information can be transmitted to one or more mobile devices 16 using wired connections, e.g., via one or more universal serial bus (USB) connections, between the network 12 and one or more of the mobile devices 16 and/or between the PCS 14 and one or more of the mobile devices 16.

The particular information transferred depends on the end user and/or the application or applications involved. For example, a mobile device end user can populate their mobile device with their personal profile and application information, from the master copy of mobile device user information stored on the PCS 14, to allow their mobile device and various applications associated with their mobile device to operate according to the end user's personal preferences. Also, for example, a mobile device end user can populate their mobile device with the latest, updated version of their electronic phonebook, i.e., the names and telephone numbers of the end user's personal contacts.

With respect to its ability to populate mobile devices 16 with end user application and profile information, the PCS 14 effectively replaces the subscriber identity module (SIM) card used in conventional mobile devices. In general, conventional SIM cards allow a mobile device end user to access various networks and network services using the mobile device, such as cellular telephone service. Instead of configuring a SIM card and inserting or otherwise having the SIM card physically contained within a single mobile device, the end user can provide a suitable form of end user identity information to the PCS 14, e.g., via the mobile device or some other suitable means. Upon appropriate confirmation of the end user's identity by the PCS 14, the mobile device user simply downloads to the mobile device or devices of interest the information that conventionally would be contained on the end user's SIM card.

The method 30 also can include a step 36 of authenticating the mobile device end user. The authentication step 36 typically would be performed before the transmission step 34 transmits any mobile device user information from the PCS 14 to the mobile device being used by the end user being authenticated. In this manner, the authenticating step 36 can confirm the identity of the end user requesting mobile device user information, e.g., as just discussed, as well as the nature and content of the mobile device user information available for download by the requesting end user.

End user identification and authentication can be performed by the mobile device 16 and/or the network 12 in any suitable manner. For example, the mobile device 16 can have a suitable login interface into which an end user can enter a username and password. The network 12 and/or the PCS 14 can authenticate the end user based on the entered username and password. Alternatively, biometric identity, such as reading and authenticating an end user's fingerprint, can be used to identify and authenticate an end user. In this manner, a fingerprint reading module or device can be built-in or added onto the mobile device 16. Additional verification steps, such as entering username/password information, can be used along with biometric identity.

The method also includes a step 38 of directing mobile device communications data to a mobile device based on the mobile device user information stored on the mobile device of interest. Communications routed or directed to a particular mobile device will depend on the particular mobile device user information stored on the mobile device of interest. For example, telephone calls to a particular end user (and their associated telephone number) can be directed to all mobile devices that have stored thereon the appropriate mobile device user information that allows the particular end user to receive telephone calls via a mobile device.

Examples described hereinbelow illustrate the system 10 and method 30 for accessing mobile device user information. As discussed hereinabove, instead of storing mobile device user information for a particular end user on one particular mobile device, the mobile device user information can be stored centrally on the PCS 14, along with the mobile device user information of other end users. With proper authentication and authorization, an end user can download all or a portion of their respective preference information, such as their end user application information and/or their end user personal information, from the PCS 14 to a mobile device 16 of interest. The mobile device 16 populated with the end user's user specific information then can operate according to the end user's authorized applications and according to the end user's preferences and/or profiles.

As discussed hereinabove, multiple copies of the user specific information of an end user can be retrieved and downloaded from the PCS. Therefore, an end user can populate more than one mobile device 16 with their user specific information. Also, a mobile device 16 can be populated with the end user specific information or more than one end user. In cases in which a mobile device 16 has the user specific information of more than one end user, an end user seeking to operate the mobile device 16 according to their particular user preferences or profile typically has to supply a password or other user identification information before being authorized to operate the mobile device 16 according to their personal user preferences or profile.

Also, once the end user is authorized or authenticated to operate a particular mobile device 16, the end user has the option and ability to trigger the network 12 to direct all of their voice/data traffic to the particular mobile device 16 operated by the end user. Therefore, the behavior and operating parameters of a mobile device 16 can change depending on the particular end user operating the mobile device. More than one end user can use the same mobile device 16 according to their own user preferences or profile as if each of the end users has a separate mobile device 16.

Moreover, while one end user is accessing their voice and/or data information via the mobile device 16, it is possible for the mobile device 16 to receive the voice/data information of other end users authorized to operate the mobile device 16. For example, to allow the telephone calls of more than end user to be received by a single mobile device 16, the network trigger can temporarily assign multiple mobile station integrated services digital network (MSISDN) numbers to the same temporary mobile subscriber identity (TMSI). The MSISDN number is a fixed number of digits number used to refer to a particular mobile device, e.g., a cellular telephone number. The TMSI is a randomly allocated number given to a mobile device when the mobile device is switched on. The TMSI is updated whenever the mobile device moves to a new cellular location area and, for security purposes, can be changed by the network at any time. With the temporary assignment of multiple MSISDN numbers to the same TMSI, calls to two different MSISDN numbers are forwarded to the mobile device with the co-assigned TMSI.

Mobile devices using other communication system protocols can be used in the manner just discussed. For example, for telephones and other mobile devices using session initiation protocol (SIP)-based voice over Internet protocol (VoIP) protocols, such as the IP multimedia subsystem (IMS) protocol, the mobile device can register additional end user identities with the network 12 and the PCS 14. Also, the PCS 14 and/or the network 12 can be updated with instructions and/or other information for forwarding calls of the multiple end users to the same mobile device 16.

Although it is possible for more than one end user to operate and access information via a single mobile device, it also is possible for the actual owner or master of the mobile device to control the extent of use of the mobile device by other end users. The mobile device 16 can be configured to allow the actual owner or master of the mobile device 16 to control what mobile device operations are allowed by other end users who also may be authorized to operate the particular mobile device 16. For example, the mobile device 16 can be configured to allow the actual owner or master of the mobile device to decide whether to allow other end users of the mobile device only to be able to access their respective user information, or also to be able to have their respective calls directed to the mobile device 16. Alternatively, the mobile device 16 also can be configured to allow non-owner, non-master end users to choose the extent of operations that they themselves can perform on the mobile device 16 owned by another end user. Owner and non-owner end users can determine the extent of mobile device operations via an appropriate user interface to the mobile device 16, the network 12 and/or the PCS 14, or by other suitable means.

The use of multiple end users on a single mobile device 16 also can extend to the use and maintenance of multiple subscriptions on a single mobile device 16, whether or not the multiple subscriptions belong to one or more end users. For example, a single end user can have a first mobile device subscription for use domestically and a second mobile device subscription for use internationally. In this manner, for example, an end user can take advantage of lower roaming charges locally, depending on the end users immediate physical location, while still being able to receive calls on either subscription, all while using the same mobile device 16.

The method 30 also can include a step 42 of updating the PCS 14 and/or one or more mobile devices 16 with mobile device user information. An end user can update user specific information or personal information in any suitable manner. For example, an end user can modify user specific information downloaded on a mobile device 16 via an appropriate mobile device user interface. Once the information is modified, the end user can update the PCS 14 with the modified user information in any suitable manner, e.g., manually. Alternatively, the mobile device 16 can be configured to automatically update the PCS 14 from the mobile device 16 with the modified information. Establishing an appropriate data connection with the PCS 14 can be subject to the same connection rules discussed previously herein with respect to downloading user information from the PCS 14 to the mobile device 16.

Upon initialization of the mobile device 16, there typically is a default set of profile contents available on the mobile device 16. As part of the initialization, there also can be an option to turn on the dynamic personal content update feature. Such option can also include information on how to connect to the PCS 14. For example, such connection information can include an Internet Protocol Security (IPSec) tunnel as well as raw data link configuration data. If the end user chooses not to download personal content, the default set of profile contents will be used by the mobile device 16.

In addition to modifying user information directly from the mobile device 16, an end user can modify user information indirectly, such as by using a personal computer or other appropriate device suitably connected to the PCS 14 and/or the mobile device 16. Also, it should be understood that, alternatively, the user specific information stored on the PCS 14 can be modified directly or indirectly, e.g., in the manner discussed hereinabove with respect to modifying user information stored on the mobile device 16. Once the end user (or other appropriate party) modifies the user information, the modified information can be updated between the PCS 14 and the mobile device 16, e.g., in the manner discussed hereinabove.

With respect to data synchronization, an appropriate personal content synchronization client (PCSC) process or other suitable process or processes can be run within the mobile device 16, the PCS 14 and/or the network 12. The PCSC process includes the retrieval of information corresponding to the authentication information collected from the PCS 14. The PCSC process also includes synchronizing the mobile device 16 with the PCS 14 to update the modified information between the mobile device 16 and the PCS 14.

As discussed previously herein, the mobile device 16 can be connected to the PCS 14, via the network 12, in any suitable manner. For example, the mobile device interface 28 can couple the mobile device 16 to the network 12, e.g., directly via a wired connection, or wirelessly via Bluetooth or other suitable wireless communication protocol.

In general, the PCSC process, upon activation within the appropriate device (e.g., the mobile device 16), looks for any existing data connection, e.g., to the PCS 14. If an available data connection exists, the PCSC process attempts to connect the mobile device 16 to the PCS 14, build a secure data channel or tunnel, and send over a data retrieval request, along with appropriate end user authentication information. The requested information then can be sent between the mobile device 16 and the PCS 14.

If the PCSC process can not connect the mobile device 16 to the PCS 14 through existing connections, or if there are no existing connections, the PCSC process attempts to establish and/or build a connection, as long as any newly established connection does not conflict with any existing connections. If there is a conflict with an existing connection, the end user decides whether to disconnect the conflicting connection in favor of retrieving/updating end user information. Connection rules can be established based on cost, speed and/or any other suitable data retrieval factors.

The PCSC process also can monitor the connectivity of the mobile device 16. If the mobile device 16 does not have any connectivity (i.e., there is no data connection environment present or available), a warning can be issued to the end user whenever an end user tries to retrieve or edit personal content. Also, if the mobile device 16 does not have any connectivity, the personal content download/synchronization feature also may not be available.

Retrieved end user information can be stored in one or more appropriate locations. For example, within the mobile device 16, retrieved end user information can be stored in the memory 24 or other appropriate location. However, the PCSC process should be required to contact and connect to only one target server location from which to retrieve user information. Also, for example, if the data connection is lost during data retrieval before the data transfer is complete, the partial data set can be discarded. Also, for example, the PCSC process can populate the requesting device, e.g., the mobile device 16, when the requested data transfer is complete.

The method 30 also can include a step 44 of deleting or removing all or a portion of the user information stored on the mobile device 16. It should be understood that one or more mobile devices 16 can delete or otherwise remove all or a portion of any user information previously download and/or otherwise stored thereon. In this manner, mobile devices 16 can include user information from various end users at any given time.

The method shown in FIG. 3 may be implemented in a general, multi-purpose or single purpose processor. Such a processor will execute instructions, either at the assembly, compiled or machine-level, to perform that process. Those instructions can be written by one of ordinary skill in the art following the description of the data traffic routing method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

[The protocols used to implement all or a portion of the system 10 and/or the method 30 may include one or more of the following: cordless telephony protocols, such as but not limited to Digital Enhanced Cordless Telephony (DECT), mobile telephony call signaling, e.g., the integrated dispatch enhanced network (iDEN) Network, time division multiple access (TDMA), time division multiple access (CDMA), CDMA-2000, and global system for mobile communications (GSM); IP-based Telephony Signaling, e.g., Packet Cable Network-based Call Signaling (NCS), Packet Cable Duos, session initiation protocol (SIP), mobile data service protocols, such as but not limited to general packet radio service (GPRS), simple gateway control protocol (SGCP), media gateway control protocol (MGCP) and any protocol in accordance with the H.323 standard; the Public Switched Telephone Network (PSTN); and local network interfaces that support voice and data traffic, such as but not limited to Bluetooth, and any protocols in accordance with the following standards: IEEE 802.11b, IEEE 802.11a, IEEE 802.11g, IEEE 802.11h, IEEE 802.11e and HomeRF™. The system 10 and/or the method 30 also can apply to communication devices including mobile devices that can connect to a wired local network in accordance with the Home Phoneline Networking Alliance (HPNA), the Home Plug Powerline Alliance, 10/100BaseT Ethernet, universal serial bus (USB) and IEEE 1394, broadband networking including hybrid-fiber coax network, which includes Data Over Cable Service Interface Specification (DOCSIS) compliant protocols and IP Telephony protocols, Digital Subscriber Line (DSL) Modems and Networks, Fixed Wireless Networks (e.g., multichannel multipoint distribution service (MMDS) and local multipoint distribution service (LMDS)), Bluetooth Protocol Specification, and PacketCable™ and Network-Based Call Signaling Protocol Specification (NCS). Those skilled in the art will recognize that all or a portion of the system 10 and/or the method 30 may be implemented using virtually any type of local area network protocol currently existing or to be developed in the future.

It will be apparent to those skilled in the art that many changes and substitutions can be made to the methods, devices and systems for accessing mobile device user information herein described without departing from the spirit and scope of the invention as defined by the appended claims and their full scope of equivalents.

The invention claimed is:

1. A method for accessing mobile device user information, comprising the steps of:
   providing a Personal Content Server (PCS) having mobile device user information stored thereon;
   upon authenticating at least one mobile device user, downloading from the PCS at least a portion of the mobile device user information, via a cellular network, to at least one mobile device, wherein the mobile device user information includes user specific information for the at least one mobile device user, further wherein the mobile device user information is also stored in a subscriber identity module (SIM) of at least one device, and wherein said user specific information includes subscriber information comprising at least one of:
   credit card authentication information;
   medical records; and
   user mobile telephone plan;
   wherein said user specific information allows the mobile device to operate according to user preferences of the at least one mobile device user;
   directing mobile device communications to the mobile device based on the mobile device user information downloaded to the mobile device; and
   modifying mobile device user information and updating at least one of the PCS and the mobile device with the modified mobile device user information.

2. The method as recited in claim 1, wherein the method further comprises authenticating the mobile device user before mobile device user information stored on the PCS can be downloaded to the mobile device.

3. The method as recited in claim 1, wherein downloading includes downloading the mobile device user information of more than one mobile device user from the PCS to the mobile device.

4. The method as recited in claim 1, wherein downloading includes downloading the mobile device user information of a mobile device user from the PCS to more than one mobile device.

5. The method as recited in claim 1, wherein mobile device user information includes at least one of user application information, user identity information, user personal information, user contact information, user calendar information, user subscription information and user profile information.

6. The method as recited in claim 1, wherein downloading includes wirelessly transferring the mobile device user information from the PCS to the mobile device.

7. The method as recited in claim 1, further comprising deleting mobile device user information from the at least one mobile device.

8. A device for accessing mobile device user information, comprising:
   a memory;
   a controller coupled to the memory;
   a transceiver coupled to the controller, the transceiver for communicating via a cellular network;
   wherein upon authentication of at least one mobile device user, the controller is configured to receive, via the cellular network, using the transceiver, mobile device user information from a Personal Content Server (PCS), wherein the mobile device user information includes user specific information for the at least one mobile device user, further wherein the mobile device user information is also stored in a subscriber identity module (SIM) of at least one device, and wherein said user specific information includes subscriber information comprising at least one of:
   credit card authentication information;
   medical records; and
   user mobile telephone plan;
   wherein said user specific information allows the mobile device to operate according to user preferences of the at least one mobile device user
   wherein the controller is further configured to:
      direct mobile device communications to the mobile device based on the mobile device user information downloaded to the mobile device; and
      modify mobile device user information and update at least one of the PCS and the mobile device with the modified mobile device user information.

9. The device as recited in claim 8, wherein the controller is further configured to receive authentication information from at least one mobile device user, wherein the authentication information allows the mobile device user to access from the PCS user preferences associated with the mobile device user.

10. The device as recited in claim 8, wherein the controller is configured to receive the user specific information of more than one mobile device user, wherein more than one mobile device user can operate the device.

11. The device as recited in claim 8, wherein the controller is configured to receive, via the transceiver, mobile device communications based on the mobile device user information received by the device.

12. The device as recited in claim 8, wherein the controller includes an interface coupled to the controller and configured to receive mobile device user information from the PCS via a wired connection therebetween.

13. The device as recited in claim 8, wherein the device is a mobile device selected from the group consisting of a cellular telephone, a smart telephone, a personal digital assistant (PDA), a wireless handheld device, a digital camera, a mobile communication device, a laptop personal computer (PC) and a notebook PC.

14. A system for accessing mobile device user information, comprising:
   a cellular communication network;
   at least one mobile device configured to transmit and receive mobile device communications via the cellular communication network; and
   a Personal Content Server (PCS) coupled to the cellular communication network, for storing thereon mobile device user information, wherein the mobile device user information includes user specific information for at least one mobile device user, further wherein the mobile device user information is also stored in a subscriber identity module (SIM) of a least one device, and wherein said user specific information includes subscriber information comprising at least one of:
   credit card authentication information;
   medical records; and
   user mobile telephone plan;
   wherein said user specific information allows the mobile device to transmit and receive mobile device communications according to user preferences of the at least one mobile device user,
   wherein upon authentication of at least one mobile device user, the at least one mobile device is configured to access from the Personal Content Server (PCS), via the cellular communication network, mobile device user information including user specific information for the at least one mobile device user, wherein the at least one mobile device user can transmit and receive mobile device communications via the at least one mobile device according to user preferences included in the accessed user specific information;
   wherein mobile device communications can be directed to the mobile device based on the mobile device user information downloaded to the mobile device; and
   wherein mobile device user information can be modified and at least one of the PCS and the mobile device can be updated with the modified mobile device user information.

15. The system as recited in claim 14, wherein the at least one mobile device is configured to receive authentication information from at least one mobile device user, wherein the authentication information allows the mobile device user to transfer user specific information associated with the mobile device user between the PCS and the at least one mobile device.

16. The system as recited in claim 14, wherein the mobile device is configured to receive the user specific information of more than one mobile device user, and wherein the mobile device is configured to allow more than one mobile device user to transfer mobile device communications between the cellular communication network and the mobile device.

17. The system as recited in claim 14, wherein the mobile device is selected from the group consisting of a cellular telephone, a smart telephone, a personal digital assistant (PDA), a wireless handheld device, a digital camera, a mobile communication device, a laptop personal computer (PC) and a notebook PC.

18. The system as recited in claim 14, wherein the at least one mobile device is configured to receive mobile device user information from the PCS via at least one of a wired connection and wirelessly.

19. The method as recited in claim 1, wherein the subscriber information further includes at least one of:
   subscription information for downloading and viewing movie content; and
   subscription information for downloading and viewing music content.

20. The device as recited in claim 8, wherein the subscriber information further includes at least one of:
   subscription information for downloading and viewing movie content; and
   subscription information for downloading and viewing music content.

21. The system as recited in claim 14, wherein the subscriber information further includes at least one of:
   subscription information for downloading and viewing movie content; and
   subscription information for downloading and viewing music content.

22. The method as recited in claim 1, wherein the subscriber information further includes electronic mail.

23. The device as recited in claim 8, wherein the subscriber information further includes electronic mail.

24. The system as recited in claim 14, wherein the subscriber information further includes electronic mail.

\* \* \* \* \*